US009045650B2

(12) United States Patent
Finnie et al.

(10) Patent No.: US 9,045,650 B2
(45) Date of Patent: Jun. 2, 2015

(54) POLYMER WITH SALT GROUPS AND ANTIFOULING COATING COMPOSITION COMPRISING SAID POLYMER

(75) Inventors: Alistair Andrew Finnie, Whitley Bay (GB); Clayton Price, Whitley Bay (GB); Richard Mark Ramsden, Pelaw (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 254 days.

(21) Appl. No.: 13/058,714

(22) PCT Filed: Aug. 10, 2009

(86) PCT No.: PCT/EP2009/060317
§ 371 (c)(1),
(2), (4) Date: Feb. 11, 2011

(87) PCT Pub. No.: WO2010/018144
PCT Pub. Date: Feb. 18, 2010

(65) Prior Publication Data
US 2011/0144217 A1 Jun. 16, 2011

Related U.S. Application Data

(60) Provisional application No. 61/091,813, filed on Aug. 26, 2008.

(30) Foreign Application Priority Data

Aug. 13, 2008 (EP) .................................... 08162288

(51) Int. Cl.
C09D 5/16 (2006.01)
C08G 75/24 (2006.01)
A01P 15/00 (2006.01)
C08F 220/18 (2006.01)

(52) U.S. Cl.
CPC ................ C09D 5/16 (2013.01); C09D 5/1656 (2013.01); C09D 5/1687 (2013.01); C08F 220/18 (2013.01)

(58) Field of Classification Search
CPC ...... C09D 5/16; C09D 5/1687; C09D 5/1656; C08F 220/18
USPC .......................... 523/122; 514/772.3; 528/321
See application file for complete search history.

(56) References Cited

U.S. PATENT DOCUMENTS

2008/0124298 A1* 5/2008 Solomon et al. ........... 424/78.09

FOREIGN PATENT DOCUMENTS

| EP | 0 529 693 | 3/1993 |
| EP | 0 663 409 | 7/1995 |
| GB | 798 604 | 7/1958 |
| GB | 1 457 590 | 12/1976 |
| WO | 00/43460 | 7/2000 |
| WO | 02/02698 | 1/2002 |
| WO | 2004/018533 | 3/2004 |
| WO | 2005/075581 | 8/2005 |

OTHER PUBLICATIONS

International Search Report, PCT/EP2009/060317, mailed Oct. 2, 2009, 4 pages.
European Search Report, EP 08162288.8, mailed Dec. 18, 2008, 6 pages.
Szegezdi, Jozsef, et al., "New method for $pK_a$ estimation", presented at eCheminformatics, Nov. 10-14, 2003.
Szegezdi, Jozsef, et al., "Prediction of dissociation constant using microconstants", presented at the American Chemical Society National Meeting, Mar. 28-Apr. 2004.
Szegezdi, Jozsef, et al., "A method for calculating the $pK_a$ values of small and large molecules", presented at the American Chemical Society Spring Meeting, Mar. 25-29, 2007.

* cited by examiner

Primary Examiner — Kriellion Sanders
(74) Attorney, Agent, or Firm — Kenyon & Kenyon LLP

(57) ABSTRACT

A film-forming polymer with improved chemical stability in antifouling coating applications, said polymer bearing pendant to its backbone a salt of (i) a basic group with a first $pK_a$ of the conjugate acid of at least 4.0 and (ii) an organic acid with a first $pK_a$ of 2.0 or less; said basic group being covalently bonded to the polymer backbone.

21 Claims, No Drawings

POLYMER WITH SALT GROUPS AND ANTIFOULING COATING COMPOSITION COMPRISING SAID POLYMER

REFERENCE TO RELATED APPLICATION(S)

This application is the U.S. National Phase of PCT/EP2009/060317 filed on Aug. 10, 2009, and claims the benefit of U.S. Provisional Application No. 61/091,813 filed on Aug. 26, 2008.

This invention relates to a polymer and its use in antifouling paints for marine applications.

Man-made structures such as boat hulls, buoys, drilling platforms, oil production rigs, and pipes which are immersed in water are prone to fouling by aquatic organisms such as green and brown algae, barnacles, mussels, and the like. Such structures are commonly of metal or wood, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and secondly because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use antifouling paint, for instance as a top coat on ships' hulls, to inhibit the settlement and growth of marine organisms such as barnacles and algae, generally by release of a biocide for the marine organisms.

Traditionally, antifouling paints comprise a relatively inert binder with a biocidal pigment that is leached from the paint. Among the binders which have been used are vinyl resins and rosin. Vinyl resins are seawater-insoluble and paints based on them use a high pigment concentration so as to have contact between the pigment particles to ensure leaching. Rosin is a hard brittle resin that is very slightly soluble in seawater. Rosin-based antifouling paints have been referred to as soluble matrix or eroding paints. The biocidal pigment is very gradually leached out of the matrix of rosin binder, leaving a skeletal matrix of rosin, which is washed off the hull surface to allow leaching of the biocidal pigment from deep within the paint film.

Many successful antifouling paints in recent years have been "self-polishing copolymer" paints based on a polymeric binder to which biocidal tri-organotin moieties are chemically bound and from which the biocidal moieties are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB-A-1 457 590.

However, the use of tri-organotin has been prohibited world-wide. Hence, there is a need for alternative antifouling substances that can be used in antifouling compositions. One such alternative is disclosed in WO 05/075581. The coating composition disclosed in this document comprises a binder polymer comprising pendant to the backbone one or more salts of amine- or phosphine-functional groups and/or one or more salts of phosphine-functional groups comprising a group of formula (I):

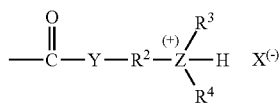

In this formula,
Y is O or NH, Z is N or P,
$R^2$ is a $C_2$-$C_{12}$ divalent hydrocarbon group, preferably a $C_2$-$C_8$ divalent hydrocarbon group,
$R^3$ and $R^4$ independently represent a hydrogen atom or an alkyl group or an optionally substituted phenyl group, and
X is the anionic residue of an acid having an aliphatic, aromatic, or alkaryl hydrocarbon group comprising at least 5 carbon atoms.

The acid/base combinations disclosed in this document are trialkyamine bases with long chain carboxylic acids like rosin and palmitic acid. That is: combinations of a relatively strong base with a relatively weak acid.

It has now been found that the chemical stability of these systems can be further improved if the salt pendant to the backbone of the polymer is a combination of a strong acid and a strong base.

The relative strengths of the acid and base directly influence the suitability of the salt that is formed. The relative strength of the acid and base are determined not just by the acidic or basic functional group but by all the other substituents on the molecule, including those that are spatially far removed from the acid and base functionality.

The present invention therefore relates to a film-forming polymer bearing pendant to its backbone a salt of (i) a basic group with a first $pK_a$ of the conjugate acid of at least 4.0 and (ii) an organic acid with a first $pK_a$ of 2.0 or less; said basic group being covalently bonded to the polymer backbone.

"The first $pK_a$ of the organic acid" determines the relative strength of the acid and can be defined as the negative logarithm of the aqueous dissociation or ionisation constant of the most acidic group that is present. The value of the first pKa of the acid decreases as the acid strength increases.

"The conjugate acid" is the protonated form of the base. The first $pK_a$ of the conjugate acid" determines the relative strength of the base and can be defined as the negative logarithm of the aqueous dissociation or ionisation constant of the conjugate acid of the most basic group that is present. The value of the first pKa of the conjugate acid increases as the strength of the base increases.

The first pKa of the acid and the first pKa of the conjugate acid of the base can be calculated from the partial charge distribution and the atomic polarizability of microspecies using empirical linear or non-linear equations. A suitable method has been described by Szegezdi and Csizmadia (New method for pKa estimation, presented at eCheminformatics, Nov. 10-14, 2003), Szegezdi and Csizmadia (Prediction of dissociation constants using microconstants (presented at the American Chemical Society National Meeting, March 28-April 2004, updated Apr. 15, 2004), and Szegezdi and Csizmadia (A method for calculating pKa values of small and large molecules; presented at the American Chemical Society Spring Meeting, Mar. 25-29, 2007).

The basic group has a first $pK_a$ of the conjugate acid of at least 4.0, preferably at least 5.0, more preferably at least 6.0, even more preferably at least 7.0, and most preferably at least 8.0.

Examples of suitable basic groups are basic groups containing nitrogen or phosphorous, such as those amines, heterocyclic nitrogen bases, and phosphines having a first pKa of the conjugate acid of at least 4.0. More preferred basic groups are alkylamine groups such as trialkylamine groups and dialkylamine groups, and pyridine groups having a first pKa of the conjugate acid of at least 4.0. The alkyl groups of these amine groups are preferably small, such as methyl and/or ethyl groups.

As mentioned before, the relative strength of the base is determined not just by the basic functional group but by all the other substituents on the molecule, including those that are spatially far removed from the base functionality.

From the above, it follows that the basic groups should be able to be protonated. Quaternary ammonium groups are, therefore, not considered as basic groups or conjugated acids thereof.

The organic acid has a first $pK_a$ of 2.0 or less, preferably 1.0 or less, more preferably 0.0 or less, even more preferably −1.0 or less.

Organic sulphonic acids containing an aliphatic, aromatic, or aralkyl hydrocarbon group and having a first pKa of 2.0 or less are the preferred organic acids for use in the present invention. Examples of suitable organic sulphonic acids are camphorsulphonic acid, benzenesulphonic acid, p-toluenesulphonic acid, cyclohexanesulphonic acid, octanesulphonic acid, butanesulphonic acid, ethanesulphonic acid, methanesulphonic acid, dodecylbenzenesulphonic acid, dodecanesulphonic acid, mesitylenesulphonic acid, 2,4,6-triisopropylbenzenesulphonic acid, and beta-naphthylsulphonic acid. Alternatively, the organic acid having a first pKa of 2.0 or less may be an acid having marine biocidal properties. An example of a suitable organic acid having marine biocidal properties is a sulphuric acid ester such as zosteric acid.

As mentioned before, the relative strength of the acid is determined not just by the acid functional group but by all the other substituents on the molecule, including those that are spatially far removed from the acid functionality.

The polymer of the present invention may be prepared by polymerising a monomeric salt derived from an organic acid having a first pKa of 2.0 or less and a polymerisable base having a first pKa of the conjugate acid of at least 4.0, or a mixture of such monomeric salts, optionally in combination with one or more co-monomers.

The polymerisable base is preferably a basic group-containing olefinically unsaturated monomer such as (meth)acrylate or a vinyl monomer. Examples of suitable monomeric salts are the organic sulphonate salts of dialkylaminoalkyl (meth)acrylates, dialkylaminoalkyl (meth)acrylamides, and vinylpyridines.

Examples of suitable dialkylaminoalkyl (meth)acrylates are dimethylaminoethyl (meth)acrylate, diethylaminoethyl (meth)acrylate, dimethylaminopropyl (meth)acrylate and diethylaminopropyl (meth)acrylate; examples of suitable dialkylaminoalkyl (meth)acrylamides are dimethylaminoethyl (meth)acrylamide, diethylaminoethyl (meth)acrylamide, dimethylaminopropyl (meth)acrylamide and diethylaminopropyl (meth)acrylamide; examples of vinylpyridines are 4-vinylpyridine and 2-vinylpyridine.

The polymer according to the present invention is said to be film-forming, which means that, if comprised in a coating composition, it can form part of the binder system.

The polymer according to the present invention is preferably derived from a monomer mixture comprising at least 5 mol %, more preferably at least 10 mol % of one or more monomeric salts. Preferably, less than 70 mol %, more preferably less than 60 mol % of the monomers from which the polymer is derived is a monomeric salt.

Monomers that can be co-polymerised with the monomeric salt to form a polymer according to the present invention include various olefinically unsaturated monomers like acrylate or methacrylate esters, olefinically unsaturated carboxylic acids, styrene, and olefinically unsaturated triorganosilyl esters.

Examples of (meth)acrylate esters are methyl (meth)acrylate, ethyl (meth)acrylate, butyl (meth)acrylate, 2-ethylhexyl (meth)acrylate, 2-hydroxyethyl (meth)acrylate, cyclohexyl (meth)acrylate, methoxyethyl (meth)acrylate, polyoxyethylene glycol monoalkyl ether (meth)acrylate, such as polyoxyethylene (n=8) glycol monomethyl ether methacrylate and isobornyl (meth)acrylate.

Examples of olefinically unsaturated carboxylic acids are acrylic acid, methacrylic acid, and acid-functional esters or amides of acrylic acid or methacrylic acid such as mono-2-(methacryloyloxy)ethyl succinate, mono-2-(methacryloyloxy)ethyl phthalate, 2-acrylamidoglycolic acid, and 3-acrylamido-3-methylbutyric acid. The olefinically unsaturated carboxylic acid may optionally be further reacted, either before or after polymerisation, to form a seawater-reactive group such as a metal ester of the type described WO 00/043460.

Examples of olefinically unsaturated triorganosilyl esters are triorganosilyl acrylate and methacrylate esters, such as trimethylsilyl (meth)acrylate, triethylsilyl (meth)acrylate, tri-n-propylsilyl (meth)acrylate, triisopropylsilyl (meth)acrylate, tri-n-butylsilyl (meth)acrylate, triisobutylsilyl (meth)acrylate, tri-tert-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, dimethylphenylsilyl (meth)acrylate, dimethylcyclohexyl (meth)acrylate, ethyldimethylsilyl (meth)acrylate, n-butyldimethylsilyl (meth)acrylate, t-butyldimethylsilyl (meth)acrylate, diisopropyl-n-butylsilyl (meth)acrylate, n-octyldi-n-butylsilyl (meth)acrylate, diisopropylstearylsilyl (meth)acrylate, dicyclohexylphenylsilyl (meth)acrylate, t-butyldiphenylsilyl (meth)acrylate, and lauryldiphenylsilyl (meth)acrylate.

Alternatively, the polymer of the present invention may be prepared by the addition of an acid having a first pKa of 2.0 or less to a polymer derived from a polymerisable monomeric base having a first pKa of the conjugate acid of at least 4.0, and optionally one or more co-monomers. The polymer derived from the monomeric base is preferably formed from a monomer mixture comprising at least 5 mol %, more preferably at least 10 mol % of one or more monomeric bases. Preferably, less than 70 mol %, more preferably less than 60 mol % of the monomers from which the polymer is derived is a monomeric base.

Examples of suitable monomeric bases are dialkylaminoalkyl (meth)acrylates, dialkylaminoalkyl (meth)acrylamides, and vinylpyridines. Examples of suitable dialkylaminoalkyl (meth)acrylates are dimethylaminoethyl (meth)acrylate and diethylaminoethyl (meth)acrylate; examples of suitable dialkylaminoalkyl (meth)acrylamides are dimethylaminoethyl (meth)acrylamides and diethylaminoethyl (meth)acrylamides; examples of vinylpyridines are 4-vinylpyridine and 2-vinylpyridine.

Examples of co-monomers include the various olefinically unsaturated monomers like acrylate or methacrylate esters, olefinically unsaturated carboxylic acids, styrene, and olefinically unsaturated triorganosilyl esters, as mentioned above in relation to the co-polymerisation with the monomeric salts.

The present invention also relates to the use of the polymer of the invention in antifouling coating compositions. Such coating compositions may contain an ingredient having marine biocidal properties. This ingredient can be pigmentous or non-pigmentous. A mixture of ingredients having biocidal properties can be used. Examples of suitable biocides are inorganic metalliferous biocides, e.g. copper oxides, copper thiocyanate, copper bronze, copper carbonate, copper chloride, copper nickel alloys; organometallic biocides, e.g. zinc pyrithione (the zinc salt of 2-pyridinethiol-1-oxide), copper pyrithione, bis(N-cyclohexyl-diazenium dioxy) copper, zinc ethylene-bis(dithiocarbamate) (i.e. zineb), zinc dimethyl dithiocarbamate (ziram), and manganese ethylene-bis(dithiocarbamate) complexed with zinc salt (i.e. mancozeb); and organic biocides, e.g. formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl)pyridine, 2-methylthio-4-butylamino-6-cyclopopylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, 3-iodo-2-propynylbutyl carbamate, medetomidine, boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethylpyrrole, and a furanone, such as 3-butyl-5-(dibromomethylidene)-2(5H)-furanone, and mixtures thereof.

In one preferred embodiment of the present invention, the coating composition contains a sparingly soluble copper-based inorganic metalliferous biocide in combination with one or more organometallic or organic biocides. In another preferred embodiment of the present invention, the coating composition is essentially free of copper-based inorganic metalliferous biocides.

The antifouling coating composition preferably contains the polymer according to the present invention in an amount of at least 3 wt %, preferably at least 6 wt %, more preferably at least 10 wt %. It is generally present in an amount of at most 60 wt %, preferably at most 50 wt %, more preferably at most 45 wt %.

The total amount of ingredients having biocidal properties for aquatic organisms is preferably between 0.1 and 70 wt %, more preferably between 1 and 60 wt %, even more preferably between 2 and 55 wt %, based upon the total weight of the coating composition.

In addition to an ingredient having marine biocidal properties, the coating composition can contain (other) pigments. For instance, pigments which are reactive with or soluble in seawater such as zinc oxide or gypsum, or pigments which are not reactive with seawater and may be highly insoluble in seawater (solubility below 0.5 part per million by weight), such as titanium dioxide or ferric oxide or an organic pigment such as phthalocyanine or azo pigment. Such highly insoluble pigments are preferably used at less than 60% by weight of the total pigment content of the paint, most preferably less than 40%.

The antifouling coating composition may further comprise a rosin material as an additional binder material. The ratio of the rosin binder material to the polymer according to the invention influences the strength of the paint film and/or the controlled erosion of the rosin-based paint matrix.

According to a preferred embodiment of the invention, the antifouling coating composition comprising the rosin material and the polymer according to the present invention in a weight ratio of at least 1:99, more preferably at least 5:95, even more preferably at least 25:75, and most preferably at least 35:65. The weight ratio rosin to the polymer of the present invention is preferably not higher than 99:1, more preferably not higher than 80:20.

The rosin material preferably is rosin, more particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate.

In addition, the antifouling coating composition may comprise a non-hydrolysing, water-insoluble film-forming polymer (B). This non-hydrolysing, water-insoluble film-forming polymer (B) can for example be a vinyl ether polymer—e.g. a poly(vinyl alkyl ether), such as polyvinyl isobutyl ether—or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, and a vinyl acetate polymer such as polyvinyl acetate or a vinyl acetate vinyl chloride copolymer. Other examples of suitable polymers (B) are modified alkyd resins, epoxy polymers, epoxy esters, epoxy urethanes, polyurethanes, linseed oil, castor oil, soya bean oil and derivatives of such oils, and chloride-containing copolymers. Polymer (B) can alternatively be a polyamine, particularly a polyamide having a plasticising effect such as a polyamide of a fatty acid dimer or the polyamide sold under the Trademark "Santiciser".

Polymer (B) is preferably present in the antifouling coating composition in an amount of less than 99% by weight of the total binder content of the coating composition, more preferably less than 75%, and most preferably less than 65%.

In another embodiment, the antifouling coating composition may comprise one or more film-forming polymers (C) which are reactive in water, slightly water-soluble or water-sensitive, but which are free of groups pendant to its backbone which are a salt of (i) a basic group with a first $pK_a$ of the conjugate acid of at least 4 and (ii) an organic acid with a first $pK_a$ of 2.0 or less.

Polymer (C) is preferably present in the antifouling coating composition in an amount of less than 99% by weight of the total binder content of the coating composition, more preferably less than 75%, and most preferably less than 65%.

An example of a suitable polymer (C) is a polymer as described in WO 00/043460, having an acrylic backbone bearing at least one terminal group of the formula:

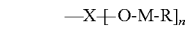

wherein X represents

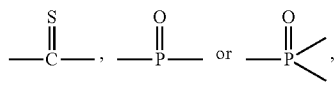

or, preferably,

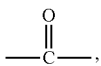

M is a metal selected from zinc, tellurium, or, preferably, copper,
n is an integer of 1 to 2; and R represents an organic residue selected from

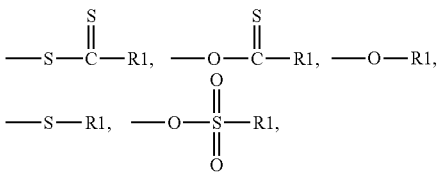

or, preferably,

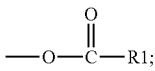

wherein R1 is a monovalent organic residue.

Another example of a suitable polymer (C) is an acid-functional film-forming polymer, the acid groups of which are blocked by quaternary ammonium groups or quaternary phosphonium groups, as described in WO 02/02698, or by organic amines, preferably containing an aliphatic hydrocarbon group having 8 to 25 carbon atoms, as disclosed in EP 0 529 693.

A further example of a suitable polymer (C) is a polymer comprising quaternary ammonium groups and/or quaternary phosphonium groups bound (pendant) to the backbone of the polymer, said quaternary ammonium groups and/or quaternary phosphonium groups being neutralised or, in other words, blocked or capped, by counter-ions consisting of the anionic residue of an acid having an aliphatic, aromatic, or alkaryl hydrocarbon group comprising at least 6 carbon atoms. Such systems are described in WO 04/018533.

A further example of a suitable polymer (C) is a silyl ester copolymer comprising at least one side chain bearing at least one terminal group, as disclosed in WO 05/005516. Such a polymer contains at least one side chain bearing at least one terminal group according to the formula:

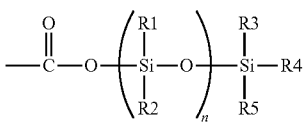

wherein n is 0 or an integer of 1 to 50, and R1, R2, R3, R4, and R5 are each independently selected from the group consisting of optionally substituted C1-20-alkyl, optionally substituted C1-20-alkoxy, optionally substituted aryl, and optionally substituted aryloxy. Preferably, at least one of the groups R1-R5 in the silyl ester copolymer is methyl, isopropyl, n-butyl, isobutyl, or phenyl. More preferably, n is 0 and R3, R4, and R5 are the same or different and represent isopropyl, n-butyl, or isobutyl.

Such a polymer can be obtained by copolymerising one or more vinyl polymerisable monomers with one or more monomers comprising one or more olefinic double bonds and one or more of the above-described terminal groups.

Other examples of suitable polymers (C) are polyvinyl methyl ether, polyvinyl ethyl ether, alkyd resins, modified alkyd resins, polyurethanes, saturated polyester resins, and poly-N-vinyl pyrollidones.

The antifouling coating composition may further contain a solvent, for example an aromatic hydrocarbon such as xylene, toluene or trimethylbenzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, or a mixture of two or more of these solvents. Alternatively, the antifouling coating composition may be water-borne.

The antifouling coating composition may further include a non-polymeric plasticiser. Such a plasticiser can for example be present at up to 50% by weight based on the total weight of polymer, most preferably at least 10% and up to 35% by weight based on the total weight of polymer. Examples of such plasticisers are phthalate esters such as dibutyl phthalate, butyl benzyl phthalate or dioctyl phthalate, phosphate triesters such as tricresyl or tris(isopropyl)phenyl phosphate, or chlorinated paraffins.

The antifouling coating composition can additionally contain other additives, for instance conventional thickeners, particularly thixotropes such as silica, bentonite, or a polyamide wax and/or stabilisers, for example zeolites or aliphatic or aromatic amines such as dehydroabietylamine.

EXAMPLES

General Procedures

Polymer Preparation

To a polymerisation reaction vessel containing about 350 g of a 1:1 xylene:butanol mixture at 85° C. was added over 3% h with mechanical stirring, a solution of monomers consisting of 0.47 moles of a monomeric salt in 200 g (1:1) xylene:butanol, 0.94 moles isobornyl methacrylate, 0.94 moles n-butyl methacylate, and 0.0235 moles 2,2'-azodi(2-methylbutyronitrile) initiator (AMBN). Once the addition of the solution was complete, the temperature was increased to 95° C. and a boost amount of AMBN (0.0117 moles) was added. The reaction was maintained at this temperature for a further 2 h. After cooling, the product polymer solution was placed in a storage vessel.

Paint Formulation

The polymers were formulated into antifouling paints containing about 33 wt % of the polymer solution, about 43 wt % of copper-containing biocide, about 12 wt % of zinc oxide, about 5 wt % of solvent (xylene), and 7 wt % of other pigments, dispersants, and thixotropes. The paints were manufactured using high speed dispersion methods.

Comparative Example A

In this example, a polymer containing the salt of a strong base and a weak acid was prepared according to the general procedure described above. The monomeric salt used to prepare the polymer was the salt of the strong base dimethylaminopropyl methacrylamide (first pKa 9.30) and the weak acid component is palmitic acid (pKa 4.95).

This monomeric salt was prepared by dissolving 80 g (0.47 moles) of dimethylaminopropyl methacrylamide in 300 g methanol in a stirred 2 L two-necked round bottom flask. To this was added powdered palmitic acid (120.49 g, 0.47 moles). The resulting suspension was stirred at room temperature overnight, dissolution of the palmitic acid occurred as the salt formation proceeded. The resultant colourless liquid was gravity filtered to remove any residual particulate and the solvent was removed under reduced pressure. $^1$H NMR confirmed quantitative formation of the desired monomer. The resulting viscous liquid was used without further purification.

The monomeric salt was analysed using infra-red (IR) spectroscopy (solid sample analysis using Avatar 360 infrared spectrometer with Golden Gate diamond ATR attachment). An absorbance characteristic of free palmitic acid (carbonyl stretch, ~1700 cm$^{-1}$) is present in the spectrum of this material, indicative of incomplete salt formation.

The polymer solution that was prepared using this monomeric salt had a non volatile content of 49 wt %, as determined by the weight loss of triplicate samples dried at 105° C. for 75 mins.

The polymer solution viscosity was measured as 4.85 Poises at 23° C. using a Brookfield Cone and Plate viscometer.

Polymer molecular weight determination was carried out using size exclusion chromatography (SEC) combined with triple detection, and absolute molecular weights were calculated through light scattering (LS) detection. The polymer had a number-average molecular weight ($M_n$) of 31000, a weight-average molecular weight ($M_w$) of 89000, and a polydispersity ($D=M_w/M_n$) of 2.9.

A paint was formulated with this polymer according to the general procedure described above. The chemical stability of the paint was assessed by measuring paint viscosity (Brookfield cone and plate viscometer at 23° C.) and fineness of grind (Hegman gauge) at intervals (up to six months) for duplicate samples stored at both 23° C. and 45° C. The results are displayed in Table 1 below.

As can be seen in this table, the viscosity remained essentially constant for the duration of the test, but a rapid increase in fineness of grind was observed in samples stored at both 23° C. and 45° C. After a period of only one month the fineness of grind of the duplicate samples had increased from a measured value of <40 µm post-manufacture to >100 µm. At the two months point of assessment the fineness of grind of both samples was seen to have increased above the maximum recordable level of 150 µm.

Optical microscopy images of dry paint film after two months storage at 45° C. of the wet paint clearly showed that crystalline solid material had formed on storage, resulting in the observed increase in fineness of grind. Further examination of the crystalline solid by IR transmission spectroscopy indicated the presence of zinc palmitate.

It is theorized that, as a result of weakly acidic nature of the palmitic acid used in the synthesis of the monomeric salt, an equilibrium is formed comprised of the salt product, the constituent strong base, and the weakly acid starting materials. As a result, the free palmitic acid is readily available to undergo reaction with any available metal ion or salt present in the paint composition. In the case exemplified, the zinc palmitate detected is formed as a consequence of reaction between the zinc oxide pigment and the free palmitic acid; the solubility of the zinc complex being such that it crystallises from the paint media on storage.

Immersion of a painted test panel in the waters of Newton Ferrers (Southwest England) resulted in a 81% coverage of the panel with microfouling.

Example 1

In this example, a polymer containing a salt of a strong base and a strong acid was prepared according to the general procedure described above. The monomeric salt used to prepare the polymer was the salt of the strong base dimethylaminopropyl methacrylamide (first pKa 9.30) and the strong acid dodecylbenzenesulphonic acid (pKa −1.84).

This monomeric salt was prepared by dissolving 80 g (0.47 moles) of dimethylaminopropyl methacrylamide in 300 g of methanol in a stirred 2 L two-necked round bottom flask. To this was added over 1 h a solution of dodecylbenzenesulphonic acid (153.42 g, 0.4699 moles) in 1:1 (wt:wt) xylene: butanol (100 g). The resulting solution was stirred for a further period of 1 h. $^1$H NMR confirmed quantitative formation of the desired monomeric salt. The resulting viscous liquid was used without further purification.

The monomeric salt was analysed using infra-red (IR) spectroscopy (solid sample analysis using Avatar 360 infrared spectrometer with Golden Gate diamond ATR attachment).

The characteristic absorbances of dodecylbenzenesulphonic acid (DBSA)—at 900, 1100 and 1600 cm$^{-1}$—were absent from the IR spectrum of the monomeric salt, which instead exhibited four distinct absorbances between 1000-1200 cm$^{-1}$ that are characteristic of sulphonate salts. The addition of excess DBSA to this sample resulted in the appearance of those absorbances characteristic of free DBSA (900, 1100 and 1600 cm$^{-1}$). This evidence supports the theory that complete salt formation occurs on reaction of a strong base and strong acid.

The polymer solution that was prepared using this monomeric salt had a non volatile content of 51 wt %, as determined by the weight loss of triplicate samples dried at 105° C. for 75 mins.

The polymer solution viscosity was measured as 8.54 Poises at 23° C. using a Brookfield Cone and Plate viscometer.

Polymer molecular weight determination was carried out using size exclusion chromatography (SEC) combined with triple detection, and absolute molecular weights were calculated through light scattering (LS) detection. The polymer had a $M_n$ of 26000, a $M_w$ of 58000, and a polydispersity ($D=M_w/M_n$) of 2.2.

A paint was formulated with this polymer according to the general procedure described above. The chemical stability of the paint was assessed by measuring paint viscosity (Brookfield cone and plate viscometer at 23° C.) and fineness of grind (Hegman gauge) at intervals (up to six months) for duplicate samples stored at both 23° C. and 45° C. The results are displayed in Table 1 below.

As can be seen in this table, the paint according to this Example displayed only a moderate increase in fineness of grind from <40 µm post-manufacture to <80 µm during the first month of storage at both 23° C. and 45° C. and the fineness of grind was thereafter stable over the remainder of the 6 month test period. The paint viscosity was also essentially constant on storage over this test period at 23° C. and 45° C.

Further, the stored paint resulted in the formation of smooth films with no observed crystalline protrusions, which leads to the conclusion that the combination of strong base and strong acid leads to complete reaction on monomer salt formation. The resulting paint is chemically stable on storage, in contrast to the paint of Comparative Example A.

Immersion of a painted test panel in the waters of Newton Ferrers (Southwest England) at the same time as the paint of Comparative Example A resulted in a 55% coverage of the panel with microfouling, which leads to the conclusion that the polymer according to the present invention improves the antifouling behaviour of paints compared to the polymer of Comparative Example A.

TABLE 1

| Time | Paint Comp. Ex. A 23° C. Storage | | Paint Ex. 1 23° C. Storage | |
|---|---|---|---|---|
| (months) | Viscosity (P) | Grind (µm) | Viscosity (P) | Grind (µm) |
| 0 | 4.72 | <40 | 6.40 | <40 |
| 1 | 4.69 | >100 | 6.75 | <80 |
| 2 | 4.94 | >150 | 6.62 | <80 |
| 3 | 5.16 | >150 | 6.49 | <80 |
| 6 | 4.38 | >150 | 6.10 | <80 |

| | Paint Comp. Ex. A 45° C. Storage | | Paint Ex. 1 45° C. Storage | |
|---|---|---|---|---|
| | Viscosity (P) | Grind (µm) | Viscosity (P) | Grind (µm) |
| 0 | 4.72 | <40 | 6.40 | <40 |
| 1 | 4.81 | >100 | 7.17 | <80 |
| 2 | 4.98 | >150 | 6.58 | <80 |
| 3 | 5.08 | >150 | 6.43 | <80 |
| 6 | 4.59 | >150 | 6.41 | <80 |

Example 2 and Comparative Examples B-E

In an effort to further illustrate the relationship between acid/base $pK_a$ and the stability of the resulting polymer, a series of monomeric salts was prepared and analysed by spectroscopic methods.

Each of the monomeric salts were prepared by mixing the constituent acid/base starting materials in methanol at a concentration of 1.968 M. Following the addition of the acid/base starting materials, the mixture was stirred at room temperature for 24 h. The monomeric salt was then isolated by evaporation of the solvent.

Example 2

Monomer Comprised of Strong Base and Strong Acid

The monomeric amine which constitutes the strong base in this example is dimethylaminoethyl methacrylamide (DMAEMA; first pKa 8.42) and the strong acid component is dodecylbenzenesulphonic acid (DBSA; pKa −1.84).

Heat was evolved during mixing indicating an exothermic reaction process.

The characteristic absorbances of dodecylbenzenesulphonic acid (DBSA)—at 900, 1100 and 1600 $cm^{-1}$—were absent from the IR spectrum of the monomeric salt, which instead exhibited four distinct absorbances between 1000-1200 $cm^{-1}$ that are characteristic of sulphonate salts.

$^1$H NMR spectroscopy was carried out on a $CDCl_3$ solution of the monomeric salt (0.0827 M). Peaks associated with resonances for both $CH_2$ groups present in the DMAEMA moiety were seen to shift downfield in the spectrum of this sample when compared to the reference spectrum of the DMAEMA starting material ($CH_2$—$CH_2$—$NMe_2$ δ 4.25 shifted to δ 4.6 and $CH_2$—$CH_2$—$NMe_2$ δ 2.6 shifted to δ 3.5). In addition, both these resonances appeared as simple triplets in the spectrum of the DMAEMA starting material whereas more complex splitting patterns for each resonance were observed in the spectrum of the monomeric salt. This is attributed to the change in the chemical environment of the $CH_2$ resonances as a result of the complete protonation of the neighbouring $NMe_2$ moiety. This is indicative of complete salt formation.

Comparative Example B

Monomer Comprised of Strong Base and Weak Acid

The monomeric amine which constitutes the strong base in this example is dimethylaminoethyl methacrylamide (DMAEMA) (first pKa 8.42) and the weak acid component is palmitic acid (pKa 4.95).

An absorbance characteristic of free palmitic acid (carbonyl stretch, ~1700 $cm^{-1}$), is present in the IR spectrum of this material, indicative of incomplete salt formation.

$^1$H NMR spectroscopy was carried out on a $CDCl_3$ solution of the monomer (0.0827 M). Peaks associated with resonances for both $CH_2$ groups present in the DMAEMA moiety were again seen to shift downfield in the spectrum of this sample when compared to the reference spectrum of the DMAEMA starting material ($CH_2$—$CH_2$—$NMe_2$ δ 4.25 shifted to δ 4.35 and $CH_2$—$CH_2$—$NMe_2$ δ 2.6 shifted to δ 2.8). However, the magnitude of the change in chemical shift associated with both resonances was markedly less in this case than that observed in the spectrum of Example 2. In addition, both of these resonances appeared as simple triplets (as is the case in the spectra of the DMAEMA starting material) and did not display the fine structure noted in the spectrum of Example 2. The preceding observations suggest incomplete salt formation in this instance and indicates the presence of both starting materials and the acid-base salt product in dynamic equilibrium.

Comparative Example C

Monomer Comprised of Strong Base and Weak Acid

The monomeric amine which constitutes the strong base in this example is dimethylaminopropyl methacrylamide (DMAPMA; first pKa 9.30) and the weak acid component is hexanoic acid (pKa 5.09).

Heat was evolved during mixing indicating an exothermic reaction process.

IR spectrospcopy showed a clear absorbance at 1700 $cm^{-1}$, characteristic of free hexanoic acid. This indicates incomplete salt formation.

Example D

Monomer Comprised of Weak Base and Strong Acid

The monomeric amine which constitutes the weak base in this example is N-vinyl-2-pyrrolidone (NVP; pKa 0.07) and the strong acid component is dodecylbenzenesulphonic acid (pKa −1.84).

Heat was evolved during mixing indicating an exothermic reaction process.

IR absorbances characteristic of free unreacted dodecylbenzenesulphonic acid (900, 1100 and 1600 $cm^{-1}$) were clearly present in the spectrum of this sample. Again, this indicates incomplete salt formation.

Example E

Monomer Comprised of Weak Base and Weak Acid

The monomeric amine which constitutes the weak base in this example is N-vinyl-2-pyrrolidone (NVP; pKa 0.07) and the weak acid component is palmitic acid (pKa 4.95).

It was observed that on the addition of palmitic acid to the methanolic NVP solution, dissolution failed to occur and no noticeable temperature change was noted. From these observations it was concluded that no salt formation had taken place.

The invention claimed is:

1. A film-forming polymer bearing pendant to its backbone a salt of (i) a basic group with a first $pK_a$ of the conjugate acid of at least 4.0 and (ii) an organic acid with a first $pK_a$ of 2.0 or less; said basic group being covalently bonded to the polymer backbone, wherein the polymer backbone is comprised from olefinically unsaturated monomers.

2. The polymer according to claim 1 wherein the first $pK_a$ of the conjugate acid of the basic group is at least 8.0.

3. The polymer according to claim 1 wherein the first $pK_a$ of the organic acid is less than 0.0.

4. The polymer according to claim 1 wherein said basic group contains nitrogen or phosphorous.

5. The polymer according to claim 4 wherein the basic group is a trialkylamine, a dialkylamine, or a heterocyclic nitrogen base.

6. The polymer according to claim 1 wherein the acid is a sulphonic acid containing an aliphatic, aromatic, or aralkyl hydrocarbon group.

7. A process for the preparation of a film-forming polymer according to claim 1 comprising the step of polymerizing monomers, at least part of said monomers being monomeric salts derived from an organic acid having a first $pK_a$ of 2.0 or less and a polymerisable base having a first $pK_a$ of the conjugate acid of at least 4.0.

8. The process according to claim 7 wherein 5 to 70 mol % of said monomers are monomeric salts derived from an organic acid having a first $pK_a$ of 2.0 or less and a polymerisable base having a first $pK_a$ of the conjugate acid of at least 4.0.

9. A process for the preparation of a film-forming polymer according to claim 1 comprising the step of adding an organic acid having a first $pK_a$ of 2.0 or less to a polymer derived from monomers, at least part of said monomers being monomeric bases having a first $pK_a$ of the conjugate acid of at least 4.0.

10. The process according to claim 9 wherein 5 to 70 mol % of said monomers are monomeric bases having a first $pK_a$ of the conjugate acid of at least 4.0.

11. An antifouling coating composition comprising a polymer according to claim 1 and an ingredient having marine biocidal properties.

12. The antifouling coating composition according to claim 11 additionally comprising a rosin material.

13. A method of protecting a man-made structures immersed in water comprising applying thereon an antifouling coating composition according to claim 11.

14. The method according to claim 13, wherein the man-made structure immersed in water is selected from the group consisting of a boat hull, a buoy, a drilling platform, an oil production rig, and a pipe.

15. The antifouling coating composition according to claim 11 comprising the polymer in an amount of at least 3 wt %.

16. The antifouling coating composition according to claim 15 comprising the polymer in an amount of at most 60 wt %.

17. The antifouling composition according to claim 11, further comprising a film-forming polymer selected from a non-hydrolysing, water-insoluble film-forming polymer (B) and a film-forming polymer (C).

18. The antifouling composition according to claim 17, wherein the film-forming polymer (C) is reactive in water, slightly water-soluble or water-sensitive, and is free of groups pendant to its backbone which are a salt of (i) a basic group with a first $pK_a$ of the conjugate acid of at least 4 and (ii) an organic acid with a first $pK_a$ of 2.0 or less.

19. The antifouling composition according to claim 12, wherein the rosin material and the polymer are present in a weight ratio of at least 1:99.

20. The antifouling composition according to claim 12, wherein the weight ratio of rosin to the polymer is not higher than 80:20.

21. The polymer according to claim 1, wherein the polymer comprises monomers selected from acrylate esters, methacrylate esters, olefinically unsaturated carboxylic acids, styrene, and olefinically unsaturated triorganosilyl esters that have been polymerized into the polymer.

* * * * *